United States Patent
Peppel

[19]

[11] Patent Number: 6,161,880
[45] Date of Patent: Dec. 19, 2000

[54] END FITTING SEAL FOR FLEXIBLE PIPE

[75] Inventor: George W. Peppel, Corsicana, Tex.

[73] Assignee: Kellogg, Brown and Root, Inc., Houston, Tex.

[21] Appl. No.: 09/455,267

[22] Filed: Dec. 6, 1999

[51] Int. Cl.[7] .................................................. F16L 21/00
[52] U.S. Cl. ........................ 285/340; 285/104; 285/232; 285/245
[58] Field of Search ..................................... 285/104, 105, 285/340, 231, 232, 245, 248, 249

[56] References Cited

U.S. PATENT DOCUMENTS

| | | | |
|---|---|---|---|
| 1,817,776 | 8/1931 | Sipe . | |
| 2,021,745 | 11/1935 | Pfefferle et al. | 285/340 |
| 2,159,640 | 5/1939 | Strom | 285/105 |
| 2,201,372 | 5/1940 | Miller | 285/340 |
| 2,264,480 | 12/1941 | Owen . | |
| 2,341,164 | 2/1944 | Shimek . | |
| 2,444,380 | 6/1948 | Shimek . | |
| 2,456,081 | 12/1948 | Penick | 285/340 |
| 2,474,880 | 7/1949 | Woodling | 285/340 |
| 3,679,241 | 7/1972 | Hoffmann | 285/340 |
| 3,995,897 | 12/1976 | Paskert . | |
| 4,728,125 | 3/1988 | Reneau | 285/104 |
| 4,773,680 | 9/1988 | Krumme . | |
| 5,094,467 | 3/1992 | Lagabe | 285/105 |

FOREIGN PATENT DOCUMENTS

| | | | |
|---|---|---|---|
| 657669 | 6/1995 | European Pat. Off. | 285/340 |
| 1335121 | 7/1963 | France | 285/340 |
| 3146272 | 6/1983 | Germany | 285/104 |
| 3833535 | 4/1990 | Germany | 285/340 |
| 4234441 | 4/1994 | Germany | 285/340 |

Primary Examiner—Eric K. Nicholson
Attorney, Agent, or Firm—Daniel Rubin

[57] ABSTRACT

An end fitting/pipe coupling in which to receive a flexible pipe end to be joined includes an annular seal of chevron configuration supported in the fitting for surrounding the received pipe end and is comprised of an elastomer composition defining a plurality of uniformly spaced parallel separations each containing an annular metallic shim adapted to increasingly grip the pipe in response to a pull out force encountered by the pipe end.

5 Claims, 3 Drawing Sheets

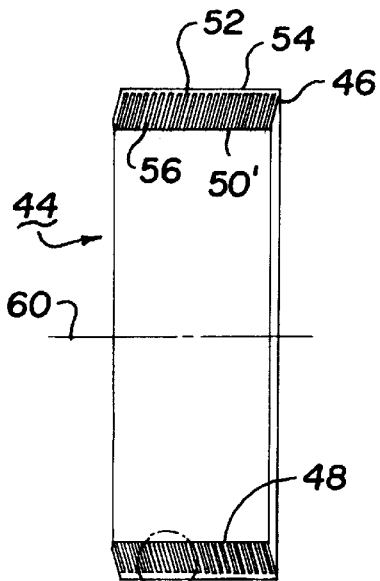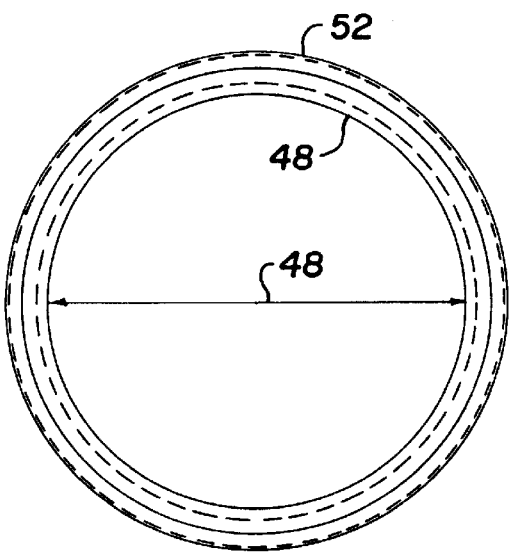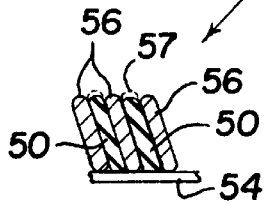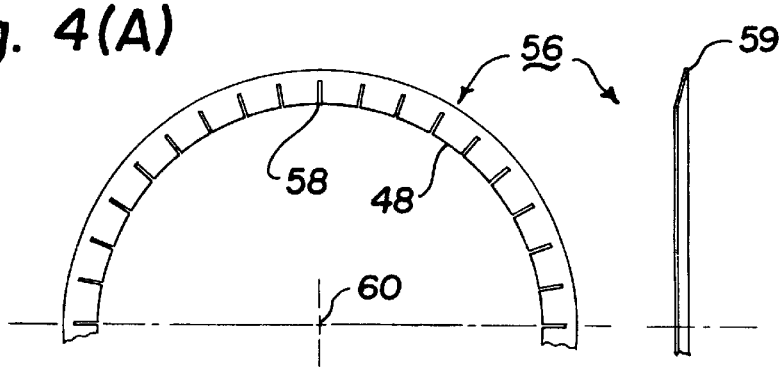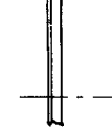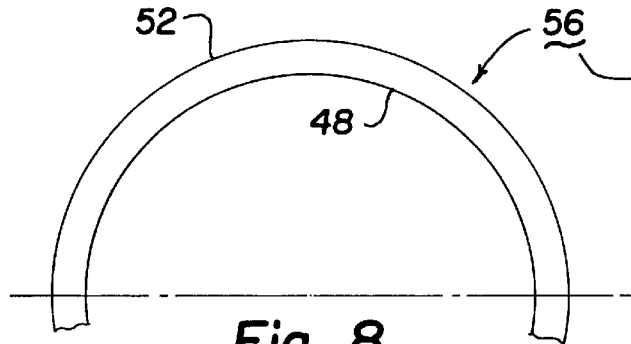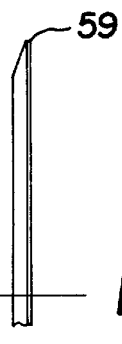

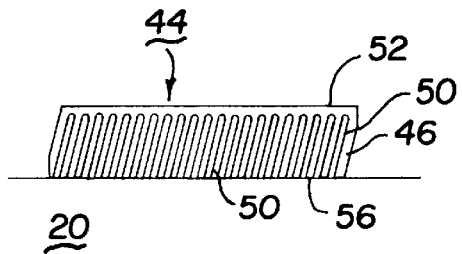
NORMAL (NO LOADS)
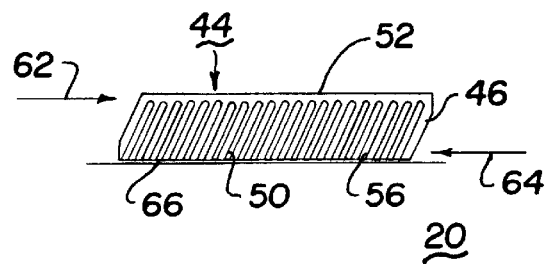
INSTALLATION FORCE
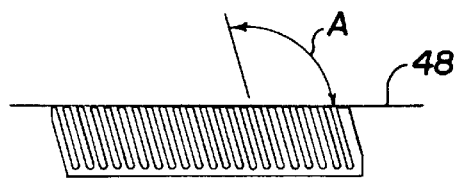
Fig. 10
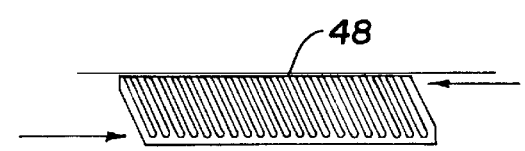
Fig. 11
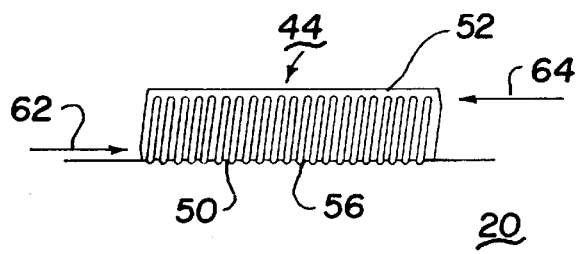
PRESSURE/TENSION LOADS
Fig. 12 a# END FITTING SEAL FOR FLEXIBLE PIPE

FIELD OF INVENTION

The field of art to which the invention relates comprises couplings and/or end fittings for retaining and sealing at least one open end of flexible plastic pipe for attachment in continuous flow line piping or to suitable utilization apparatus.

BACKGROUND OF THE INVENTION

A flexible flowline is comprised typically of several distinct concentric layers that afford strength and flexibility to the flowline. The innermost layer, known as the carcass, prevents collapse of the flowline due to external hydrostatic pressure. The immediately adjacent layer, known as the barrier, is constructed from a synthetic polymer material and serves to prevent content leakage from the flowline. There may also be succession of other layers of varying materials forming the overall composite of the flowline.

A flexible flowline may be utilized, for example, as a dynamic riser to couple a rigid flowline or another flexible flowline on the seabed to a floating vessel or buoy to convey production fluids such as oil, gas or oil/gas mixtures under pressure from an oil/gas well or platform to the vessel or buoy. Hence, an end fitting can be utilized to couple the flexible flowline at each end to an adjacent flowline or wellhead and the vessel or buoy.

A leak-tight seal contained in the end fitting has been achieved in the manner of the prior art utilizing an inner seal ring which encircles and engages the external surface of the flowline barrier. This ring can also hold the barrier and carcass in position within the end by a frictional force generated from the pressure of the seal ring on the barrier layer.

While functioning well, a problem has been recognized that when installing the pipe to within the fitting, the installation has typically required on the order of 30,000–35,000 pounds of force in order to assure the intended fit to both maintain a seal against leakage while preventing pullout from forces likely to be encountered. Such pullout forces can, example be generated from repeated thermo cycling to which the installation is ultimately exposed.

Various forms of couplers and/or end fittings are disclosed in U.S. Pat. Nos. 1,817,776; 2,264,480; 2,341,164; 2,444,380; 3,995,897 and 4,773,680.

Despite recognition of the foregoing, it has not been known heretofore how to satisfactorily eliminate the extremely high loading force incurred during installation of the pipe to within the end fitting.

OBJECTS OF THE INVENTION

It is therefore an object of the invention to provide an enhanced seal for an end fitting capable of significantly reducing the installation loading force of a received pipe while retaining the retention and sealing properties previously afforded.

It is a further object of the invention to effect the previous object with a seal that is operative to allow thermal growth and which tightens its retention force in response to external pullout forces being encountered.

It is a still further object of the invention to effect the previous objects with a seal of economical construction so as to be less costly and not to contribute to costly increases in the overall cost of the fitting.

SUMMARY OF THE INVENTION

This invention relates to a novel seal construction contained within an end fitting in which an open end of flexible pipe is to be received. More specifically, the invention relates to such an end fitting in which the seal per se contributes to the result of a significantly reduced loading force of the pipe to within the fitting while at least maintaining the sealing and retention properties of the prior art construction.

For achieving the foregoing, prior art annular metal seals within the fitting are replaced with a pair of annular seals of chevron section, formed of molded hard elastomer composition. Each chevron seal is of a rubber-metal laminate constructed of individual elastomeric discs molded about intervening metal discs. The seals are supported within the fitting with a longitudinal width formed appearing to have a plurality of simulated radial uniformly spaced elastomeric discs or fingers. The fingers have been squeezed during the molding process to inwardly terminate at a common internal diameter sized to engage the exterior periphery of a received pipe end. Between each pair of fingers are contained an annular shim of metal composition having a radial dimension originally the same as the adjacent elastomeric discs. The shims or washers are snugly retained between adjacent elastomeric discs for displacement therewith in response to any displacement induced by axial movement of a contained pipe end. When installed in the end fitting, the seals are in compression engagement about a received pipe end such that if a pull-out force is applied to the pipe, the internal diameter of the shims tend to dig into the pipe surface to create a secure hold in the manner of a Chinese finger. At the same time, the elastomeric fingers intervening between the shims are squeezed and caused to bulge so as to enhance sealing about the pipe wall.

As noted supra, previous seals utilized for this purpose have been responsible for an excessively high installation force of the pipe end to within. the fitting on the order of 20,000–35,000 pounds. By virtue of the novel chevron seal construction hereof, the required installation force has been reduced to on the order of 3000–3500 pounds without sacrifice in the retention and sealing properties previously afforded.

The above noted features and advantages of the invention as well as other superior aspects thereof will be further appreciated by those skilled in the art upon reading the detailed description which follows in conjunction with the drawings.

BRIEF DESCRIPTION OF THE DRAWINGS

FIG. 4 is an enlarged sectional elevation of the seal hereof;

FIG. 4A is a fragmentary enlargement of the encircled portion of FIG. 4;

FIG. 5 is an end view of the seal of FIG. 4;

FIG. 6 is a fragmentary end view of an individual shim in the seal of FIG. 4 containing slits to accommodate irregular or elliptical pipe shapes;

FIG. 7 is a fragmentary front view of FIG. 6;

FIG. 8 is a fragmentary end view of an individual shim in the seal to accommodate round pipe being received, FIG. 9 is a fragmentary front view of the shim of FIG. 8;

FIG. 10 diagrammatically illustrates shim and seal orientation as applied against a pipe end in the absence of external pullout forces being applied;

FIG. 11 is a diagrammatic illustration similar to FIG. 10 for shim and seal orientation during installation of a received pipe end; and FIG. 12 is similar to FIG. 10 illustrating the shim and seal orientation in response to a pullout tension load being applied to a received pipe end.

DESCRIPTION OF THE PREFERRED EMBODIMENT

Figure 1:
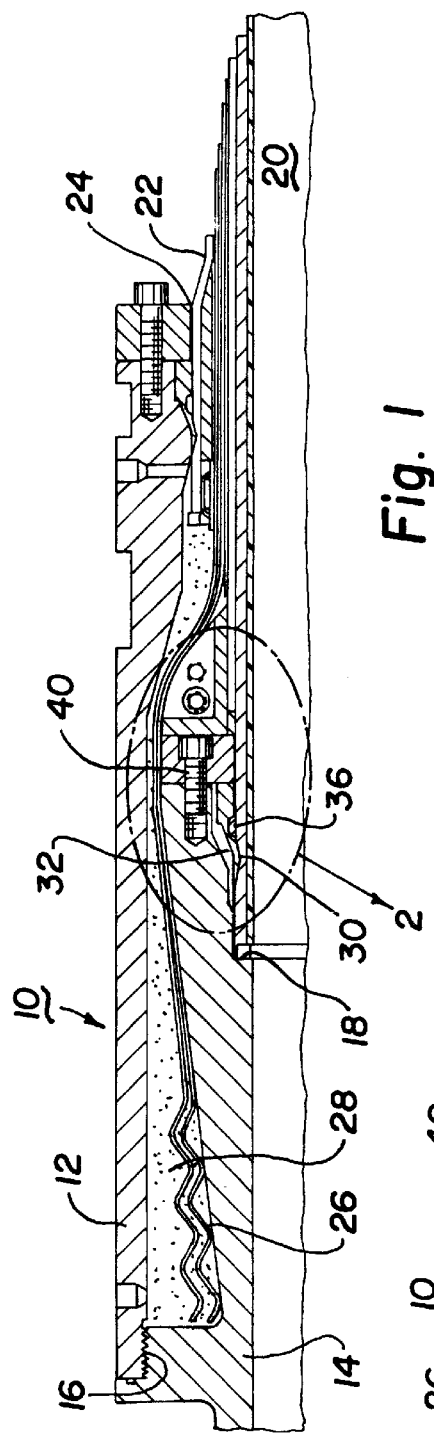
FIG. 1 is a sectional view of a prior art end fitting containing a received pipe end to be secured.

In the description which follows, like parts are marked throughout the specification and drawings with the same reference numerals respectively. The drawing figures are not necessarily to scale and in certain views, portions may have been exaggerated for purpose of clarity.

Figure 2:
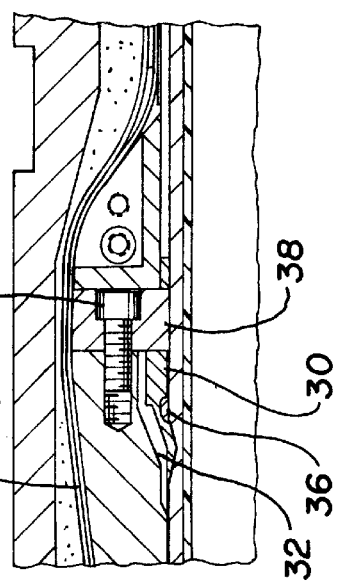
FIG. 2 is an enlargement of the encircled portion 2 of FIG. 1.
Figure 3:
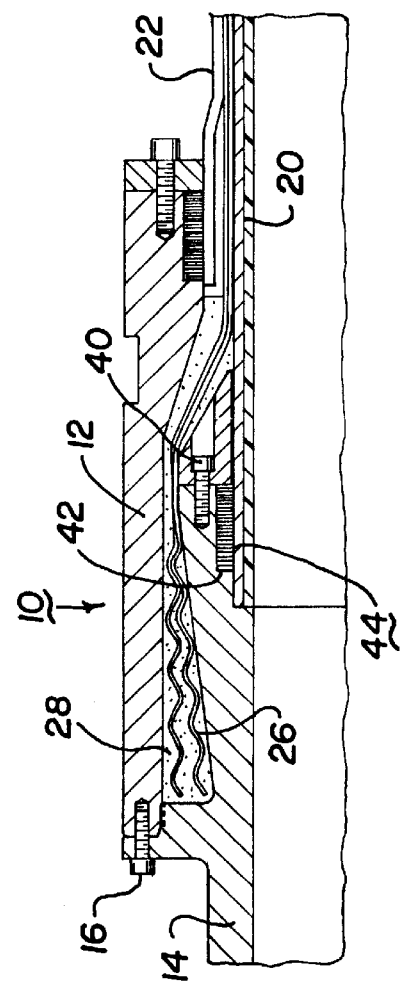
FIG. 3 is a sectional view similar to FIG. 1 containing seals constructed in accordance invention hereof.

Referring now to FIGS. 1 & 2 of the drawings, there is illustrated a prior art end fitting design 10 available from commercial sources such as Wellstream of Port of Panama City, Florida. Briefly, the end fitting is comprised of a housing 12 in which a tubular insert 14 is secured via threads 16. A counterbore 18 within insert 14 accommodates receipt of flexible pipe end 20 while an internally extending plastic cover 22 encircles the pipe about entrance 24. Corrugated wires 26 secured in epoxy 28 serve to maintain integrity of the unit. About counterbore 18 a wedge-like recess 32 is provided to receive a wedge-shaped seal housing 30 having an underside recess 36. A housing drive-ring 38 is forced into recess 32 in the course of bolt 40 being tightened so as to wedge seal housing 30 inwardly against the outer wall of pipe end 20.

Referring now to FIGS. 3–12, the previous recess 32 along with housing 30, drive ring 38 and seal 36 are replaced by an annular counterbore 42 containing a seal 44 constructed in accordance with the invention hereof Comprising seal 44 is an annular elastomer 46 formed of a plurality of individual, relatively hard and firm, rubber discs 50 defining a concentric internal diameter (I.D.) 48 closely approximating the outside diameter (O.D.) of pipe end 20. Initially, as best seen in FIGS. 4A, a plurality of elastomeric discs 50 are each separated by intervening metal shims 56 of like dimension. A rubber wrap 54 is then applied about the O.D. 52 before being molded together. Being squeezed in the course of molding, causes protrusion of the rubber ends 57 (in phantom) so as to aid when utilized in sealing against the surface periphery of pipe 20. For purposes hereof, discs 50 in the final product are canted at an angle A (FIG. 10) of about five (5) degrees. The shims 56 in this arrangement serve to maintain the rigidity and general integrity of the discs 50.

As best seen in FIGS. 6 and 7, individual shims 56 are slightly wedge-shaped or beveled in cross section with a blunt, but not sharp, edge 59 for gripping without cutting the pipe surface as will be understood. In this embodiment, shims 56 also include a plurality of uniformly spaced apart slits 58 about the I.D. extending radially of axis 60 that fill with elastomer in the course of being molded so as to more readily accommodate irregular or elliptical shape pipes 20.

FIGS. 8 and 9 are similar to FIGS. 6 and 7 but lack the slits 58 and instead are of continuous solid construction to accommodate round cross section pipe 20. As above, the I.D. 48 of the shims are blunt, by means of a radius, so as not to cut into the surface of pipe 20.

In operation, seal 44 is shown in FIG. 10 in its more or less natural state without load such that the rubber discs 50 and shims 56 extend at the obtuse angle A of about five degrees with respect to its axis 60, and with the seal I.D. 48 in close contiguous contact against the peripheral exterior surface plane of pipe 20.

In FIG. 11, there is illustrated installation of a pipe 20 such that parallel forces 62 and 64 are oppositely imposed on the I.D. 48 and O.D. 52. This results in a spreading of discs 50 as the shims 56 engage the pipe wall whereby installation of the pipe end can be readily inserted within the end fitting. In FIG. 12 the imposed forces 62 and 64 are relatively inverted with respect to the I.D. and O.D. of the seal that effectively cause shims 56 to grip, bite or otherwise penetrate without cutting into the peripheral surface of the pipe end 20. Concomitantly, discs 50 are caused to bulge into increased pressure contact against the surface of pipe 20 for enhancing the sealing effect thereat.

By virtue of the shim grip onto the pipe surface, the retention force of the seal 44 against pipe end 20 is substantially maintained if not enhanced while at the same time intervening discs 50 incur increased engagement against the surface so as to enhance the seal thereat. The ultimate effect is a preventative likelihood of pipe pullout from the end fitting with sufficient sealing so as to afford continued reliability to the installation as has been known heretofore. However, in this manner, the seal hereof affords relatively easy entrance during installation of a pipe end as compared to the prior art by a magnitude of about ten while acting as a Chinese finger at such time as a removal or pullout force is encountered.

By the above description there is disclosed a novel seal for an end fitting that contributes significantly to a reduced installation force of the received pipe end. Yet, being that the seal acts as a Chinese finger in gripping the received pipe end in response to any withdrawal force being imposed, the likelihood against separation is maintained without sacrifice in other product qualities as compared to previous installations of the prior art. The virtues thereof can be readily appreciated by those skilled in the art.

Since many changes could be made in the above construction and many apparently widely different embodiments of this invention could be made without departing from the scope thereof, it is intended that all matter contained in the drawings and specification shall be interpreted as illustrative and not in a limiting sense.

I claim:

1. In an end fitting/pipe coupling in which to receive an open end of flexible pipe to be joined including a central passage in which a flexible pipe end is to be received, a seal within the fitting/pipe coupling operatively effective to seal against leakage while resisting pullout forces applied externally to the received pipe end comprising:

an annular member of predetermined width supported within the fitting/pipe coupling and defining an internal diameter located to contiguously surround the periphery of a received pipe end; and said member being formed substantially at least about said internal diameter of spaced apart parallel discs of elastometric composition inclined at an obtuse angle relative to the axis of said internal diameter and molded about metal shims intervening between each pair of said discs from at said plane so as to be capable of imposing an increasing gripping engagement onto a pipe end within said fitting for resisting pullout forces externally encountered against said pipe end.

2. In an end fitting/pipe coupling in accordance with claim 1 in which said intervening shims are of substantially like dimension as said discs prior to said discs being molded.

3. In an end fitting/pipe in accordance with claim 2 in which the internal diameter edge-of-side shims have an edge configured to collectively grip the peripheral surface of a received pipe and to increase resistance to pipe pullout in response to an encountered pull out force being imposed against said pipe end.

4. In an end fitting/pipe coupling in accordance with claim 3 in which said shims are comprised of a metallic composition with a blunt configuration about their internal diameter edges so as to effect a penetrating surface grip of the received pipe end in response to an encountered pull out force imposed against the received pipe end.

5. In an end fitting/pipe coupling in accordance with claim 4 in which the discs of said seal member are comprised of an elastomeric composition and in a response to a pull out force encountered by said pipe end, collectively incur a forced engagement against the peripheral surface of said pipe end for enhancing the sealing thereof against content leakage from said pipe end.

* * * * *